(12) United States Patent
Smirnov et al.

(10) Patent No.: US 12,553,470 B2
(45) Date of Patent: Feb. 17, 2026

(54) CONTROL SYSTEM FOR CONTROLLING A MAGNETIC SUSPENSION SYSTEM

(71) Applicant: SPINDRIVE OY, Lappeenranta (FI)

(72) Inventors: Alexander Smirnov, Lappeenranta (FI); Nikita Uzhegov, Lappeenranta (FI)

(73) Assignee: SPINDRIVE OY, Lappeenranta (FI)

( * ) Notice: Subject to any disclaimer, the term of this patent is extended or adjusted under 35 U.S.C. 154(b) by 359 days.

(21) Appl. No.: 18/021,065

(22) PCT Filed: Jun. 21, 2021

(86) PCT No.: PCT/FI2021/050471
§ 371 (c)(1),
(2) Date: Feb. 13, 2023

(87) PCT Pub. No.: WO2022/043602
PCT Pub. Date: Mar. 3, 2022

(65) Prior Publication Data
US 2023/0340992 A1    Oct. 26, 2023

(30) Foreign Application Priority Data

Aug. 25, 2020 (FI) ...................................... 20205822

(51) Int. Cl.
*F16C 32/04* (2006.01)

(52) U.S. Cl.
CPC ...... *F16C 32/0451* (2013.01); *F16C 32/0446* (2013.01)

(58) Field of Classification Search
CPC .............. F16C 32/0451; F16C 32/0446; F16C 2380/26; F16C 32/0444; F16C 32/0453;
(Continued)

(56) References Cited

U.S. PATENT DOCUMENTS

| 3,168,487 A | 2/1965 | Spokes et al. |
| 4,999,534 A * | 3/1991 | Andrianos ............. G05D 19/02 318/128 |

(Continued)

FOREIGN PATENT DOCUMENTS

| CN | 1737388 A | 2/2006 |
| CN | 104767449 | 7/2015 |

(Continued)

OTHER PUBLICATIONS

International Search Report and Written Opinion for PCT/FI2021/050471, mailed Oct. 5, 2021, 12 pages.
(Continued)

*Primary Examiner* — Ahmed Elnakib
(74) *Attorney, Agent, or Firm* — NIXON & VANDERHYE

(57) ABSTRACT

A control system for controlling a magnetic suspension system includes sensors configured to produce position signals indicative of a position of an object to be magnetically levitated, and a controller configured to control, in accordance with the position signals, electric currents supplied to magnetic actuators of the magnetic suspension system to magnetically levitate the object. The control system includes a computing system configured to maintain and update a computational model of the magnetic suspension system based on identification runs where identification run signals are supplied to the magnetic actuators of the magnetic suspension system and responses to the identification run signals are detected from the sensors and/or the magnetic actuators. The computing system is configured to compare quantities related to the computational model to quantities related to the magnetic suspension system to reveal deviations from the expected operational conditions of the magnetic suspension system.

18 Claims, 2 Drawing Sheets

(58) Field of Classification Search
CPC .............. F16C 32/0485; F16C 32/0448; F16C 32/0474; H02N 15/00
USPC ........................................................ 310/90.5
See application file for complete search history.

(56) References Cited

U.S. PATENT DOCUMENTS

| | | | | |
|---|---|---|---|---|
| 5,736,800 | A * | 4/1998 | Iannello | ................ F16C 32/048 310/90 |
| 6,590,366 | B1 * | 7/2003 | Browning | ........... F16C 32/0451 310/90.5 |
| 6,763,285 | B2 * | 7/2004 | Setiawan | ............ F16C 32/0446 73/66 |
| 2003/0038552 | A1 | 2/2003 | Setiawan et al. | |
| 2006/0055259 | A1 * | 3/2006 | Hanlon | ............... F16C 32/0442 310/90.5 |
| 2011/0316376 | A1 * | 12/2011 | Sortore | .................... H02K 7/09 310/90.5 |
| 2013/0062982 | A1 | 3/2013 | Machmaier et al. | |
| 2017/0108038 | A1 * | 4/2017 | Jastrzebski | ......... F16C 32/0453 |
| 2017/0234363 | A1 | 8/2017 | Sakawaki | |
| 2022/0336133 | A1 * | 10/2022 | Uzhegov | .................. H02K 7/09 |

FOREIGN PATENT DOCUMENTS

| | | |
|---|---|---|
| CN | 106605073 A | 4/2017 |
| CN | 109185337 A | 1/2019 |
| EP | 3 168 487 | 5/2017 |
| EP | 3 168 488 | 5/2017 |
| EP | 3467338 A1 * | 4/2019 .......... F16C 32/0442 |
| JP | 5-288219 | 11/1993 |
| JP | H11287832 A | 10/1999 |

OTHER PUBLICATIONS

Search Report for F120205822, dated Apr. 9, 2021, 2 pages
Office Action, issued in Chinese Patent Application No. 202180055482.9 dated Jun. 13, 2025.

* cited by examiner

CONTROL SYSTEM FOR CONTROLLING A MAGNETIC SUSPENSION SYSTEM

This application is the U.S. national phase of International Application No. PCT/FI2021/050471 filed Jun. 21, 2021, which designated the U.S. and claims priority to FI patent application No. 20205822 filed Aug. 25, 2020, the entire contents of each of which are hereby incorporated by reference.

FIELD OF THE DISCLOSURE

The disclosure relates to a control system for controlling a magnetic suspension system that can be, for example but not necessarily, an active magnetic bearing "AMB" system. Furthermore, the disclosure relates to a magnetic suspension system.

BACKGROUND

Magnetic suspension systems such as e.g. active magnetic bearing "AMB" systems are commonly used for levitating e.g. rotating or oscillating objects. A typical application is levitation of a rotor of an electrical machine, e.g. a high-speed electrical machine. In many cases, the levitation is accomplished by balancing attractive forces of oppositely acting magnets and other forces acting on an object to be levitated, where at least one of the magnets is a controllable electromagnet. In principle, it is also possible to balance an attractive force of one controllable electromagnet with other forces, e.g. the gravity force, acting against the attractive force of the electromagnet. There are several different kinds of magnetic suspension systems. Some systems use permanent magnet material to generate bias magnetic fluxes, while others use direct biasing currents to generate the bias magnetic fluxes. The biasing is used to linearize the operation of the system and to improve control dynamics of the system.

Magnetic forces acting in degrees of freedom of a levitated object, e.g. a rotor of an electrical machine, need to be controlled actively because of inherent instability of the magnetic levitation. The instability is caused by the fact that a magnetic attractive force acting between a magnet and an object made of e.g. ferromagnetic material increases when an airgap between the magnet and the object gets smaller. A control system ensures stability of a magnetic suspension system, such as e.g. an active magnetic bearing "AMB" system, by providing proper control algorithms. In conjunction with an AMB system, the control system captures position of a rotor in three dimensions through a set of sensors at each end of the rotor. With this information, the control system estimates a necessary force that is to be applied on the rotor by supplying appropriate electric currents to coils of the AMB system. Furthermore, an angular sensor can be used for estimating a rotor angle and/or rotational speed around a geometric axis of rotation.

There are several challenges with rotating machinery such as e.g. unbalance, changes of rotor dynamics, and changes of airgap values due to heating and rotational expansions. In addition, there can be a need to monitor a system integrity and health status. A straightforward approach is that a manufacturer selects certain parameters to monitor, which are usually defined by a vibration level, a maximum current level, and/or maximum unbalance. If the magnetic suspension system gets out of one or more allowed boundaries a fault alarm or a warning is issued. However, this information is quite limited and can provide notification only when the magnetic suspension system is already out of the one or more allowed boundaries.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new control system for controlling a magnetic suspension system that can be, for example but not necessarily, an active magnetic bearing "AMB" system for levitating a rotating element such as e.g. a rotor of an electrical machine.

A control system according to the invention comprises:
- sensors configured to produce position signals indicative of a position of an object to be magnetically levitated,
- a controller configured to supply, in accordance with the position signals, electric currents to coils of magnetic actuators of the magnetic suspension system to magnetically levitate the object, and
- a computing system configured to maintain and update a computational model of the magnetic suspension system based on identification runs where identification run signals are supplied to the coils of the magnetic suspension system and responses to the identification run signals are detected from at least one of following: the sensors and the coils, wherein the computing system is configured to compare quantities related to the computational model to quantities related to the magnetic suspension system to reveal differences of the magnetic suspension system with respect to the computational model.

In many cases, the above-described control system can produce an indication about an anomaly in the magnetic suspension system already when the anomaly has not yet been developed so far that it significantly impacts on the operation of the magnetic suspension system because differences of the magnetic suspension system with respect to the computational model can be typically recognized even if the anomaly does not yet impact on the operation. Therefore, an early warning is available.

Moreover, an algorithm used in the above-described control system can be further developed to produce balancing data for e.g. automatic or semiautomatic balancing of a rotor of an active magnetic bearing "AMB" system. The algorithm can be configured to e.g. suggest an optimal combination of weights and holes where these weights should be placed in the rotor to make a next advancement in the balancing process.

In accordance with the invention, there is provided also a new magnetic suspension system that comprises:
- an object to be magnetically levitated, magnetic actuators configured to magnetically levitate the object, and a control system according to the invention for controlling electric currents supplied to coils of the magnetic actuators.

Exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
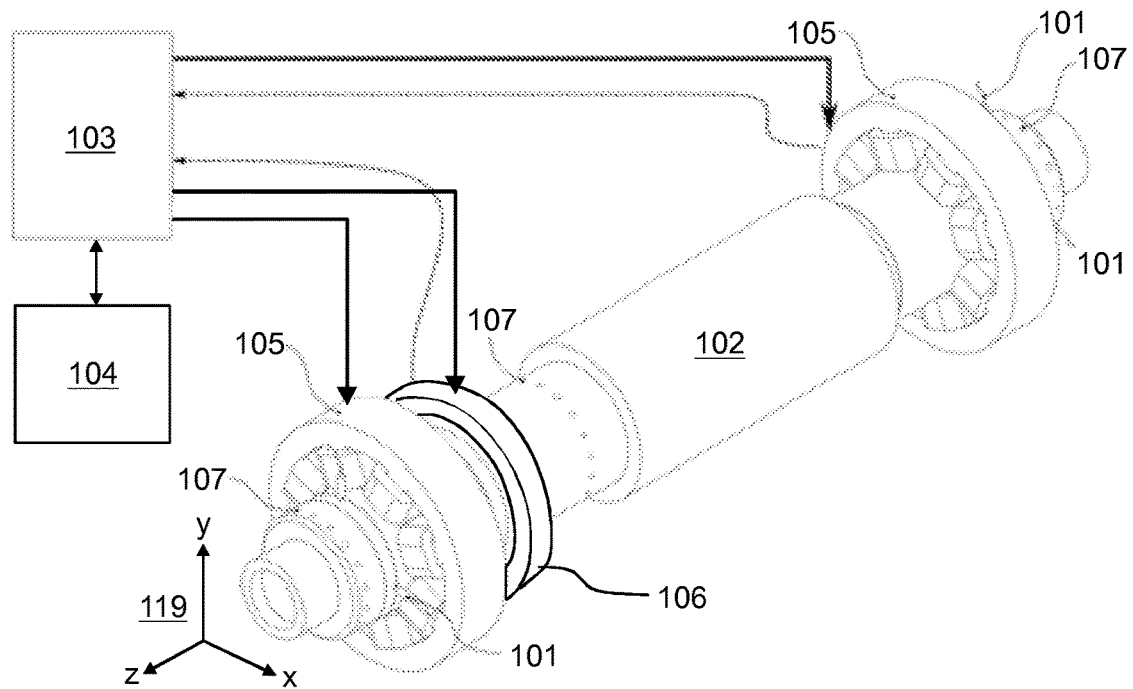
FIGS. 1a, 1b, and 1c illustrate a magnetic suspension system that comprises a control system according to an exemplifying and non-limiting embodiment.

FIG. 1a shows a magnetic suspension system that comprises a control system according to an exemplifying and non-limiting embodiment. The magnetic suspension system comprises magnetic actuators 105 and 106 configured to magnetically levitate an object 102. In this exemplifying case, the magnetic suspension system is an active magnetic bearing "AMB" system and the object 102 is a rotating element that can be e.g. a rotor of an electrical machine. The magnetic actuators 105 are radial magnetic bearings, and the magnetic actuator 106 is an axial magnetic bearing.

Figure 1B:
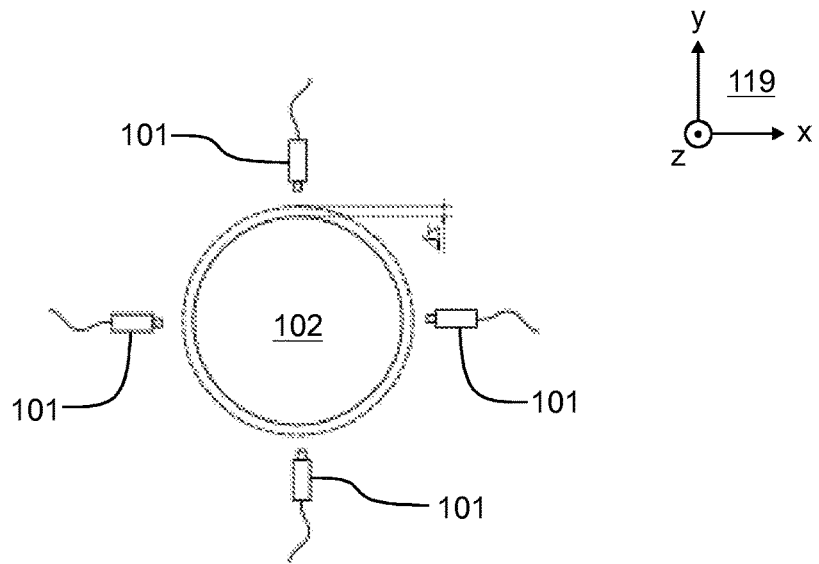

The control system comprises sensors 101 for producing position signals indicative of a position of the object 102 with respect to a reference position of the object 102. FIG. 1b illustrates an exemplifying sensor arrangement surrounding the object 102. The sensors 101 may comprise for example inductive sensors where the inductance of each inductive sensor is dependent on a distance from the inductive sensor under consideration to a surface of the object 102. It is also possible that there are means for forming the position signals based on differences between the inductances of the coils of the magnetic actuators 105 and/or 106. The inductance of each coil can be estimated based on e.g. the rate of change of electric current di/dt when the voltage directed to the coil under consideration is changed in a stepwise manner. In this exemplifying case, there is no need for separate sensors, but the sensors are implemented with the aid of the magnetic actuators 105 and/or 106.

The control system comprises a controller 103 configured to supply, in accordance with the position signals, electric currents to coils of the magnetic actuators 105 and 106 to magnetically levitate the object 102. The control system comprises a computing system 104 configured to maintain and update a computational model of the magnetic suspension system based on identification runs where identification run signals are supplied to the coils of the magnetic suspension system and responses to the identification run signals are detected from the sensors and/or the coils of the magnetic actuators. The computing system 104 is configured to compare real-time outputs of the magnetic suspension system to expected outputs of the computational model to evaluate deviations. In this way, information is obtained which can provide an insight into root causes of possible problems. In many cases, the computing system 104 can produce an indication about an anomaly in the magnetic suspension system already when the anomaly has not yet been developed so far that it significantly impacts on the operation because differences of the magnetic suspension system with respect to the computational model can be typically recognized even if the anomaly does not yet impact on the operation. Therefore, early warnings are available.

To keep the above-mentioned computational model updated, the computing system 104 applies identification algorithms by exciting the magnetic suspension system through the magnetic actuators 105 and 106 and collecting the output information through the sensors 101. It is also possible that the computing system 104 collects the output information through the coils of the magnetic actuators. The excitation happens advantageously through several predefined patterns and for the number of operational points and conditions. The model parameters of the computational model at the respective conditions are fitted to the variety of obtained data, keeping the computational model up to date with the magnetic suspension system. Identification runs for the parameter fitting may happen for example during the initial commissioning and thereafter periodically during a lifetime or when a specified event takes place and triggers an identification run. Identification runs for the parameter fitting can be trigged by a set of the events, or when operational parameters such as e.g. electric currents of the magnetic suspension system are outside of specified ranges.

Advantageously, the above-mentioned computational model may serve also several other purposes in addition to the above-described task for generating early warnings about possible anomalies. For example, a high-speed balancing procedure is discussed below. The object 102 presented in FIG. 1a has several balancing planes which are perpendicular to the z-axis of a coordinate system 199 and which provide balancing by inserting additional weight to specifically prepared holes 107. An angular position sensor is advantageously synchronized with the circumferential pitch of the holes 107, and the balancing algorithm inside the computing system 104 can be configured to estimate a next balancing step in the balancing procedure. The next balancing step can be estimated based on an unbalance vector, previous state of balancing, and an angular position of the object 102 with the computational model that contains balancing planes locations. The algorithm suggests an optimal combination of weights as well as holes where these weights should be placed to make the next advancement in the balancing process. In this way, the balancing can be carried out in an automated manner, with reduced involvement of personnel thereby eliminating a risk of manual errors. The computational model can be arranged to keep the balancing steps stored so that, if for some reason rebalancing is needed after some time, the rebalancing can be done not only by adding weights but also by removing earlier added weights.

Figure 1C:
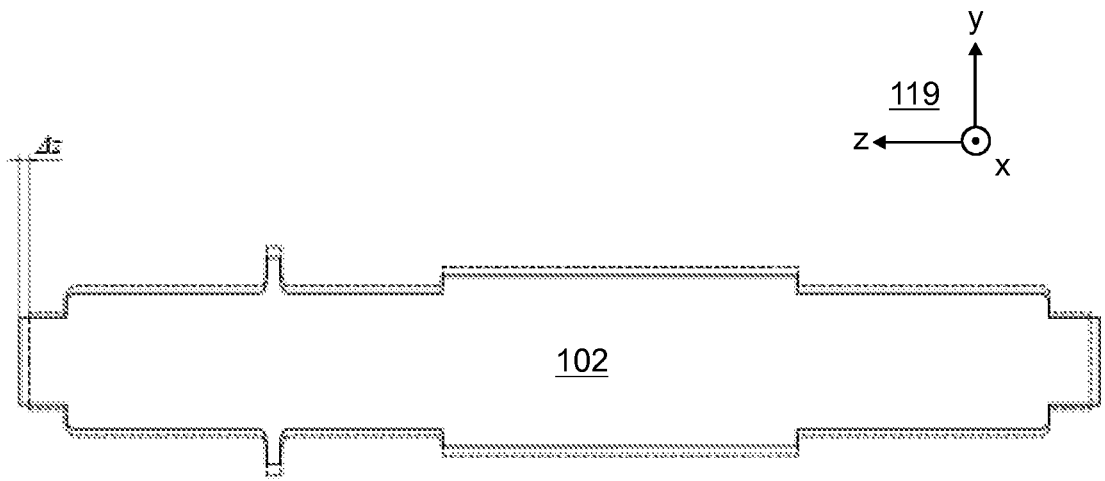

A control system according to an exemplifying and non-limiting embodiment comprises differential sensor arrangements both for radial and axial measurements. The differential sensor arrangements provide a possibility to estimate expansion and contraction of the object 102 because of changes in rotational speed and/or temperature. Information from temperature sensors inside the magnetic suspension system provides input for the computational model to evaluate the temperature of the object 102 and the magnetic actuators 105 and 106. Thus, in this exemplifying case, the effect of expansion/contraction from both sources, rotation and temperature changes, can be considered inside the control algorithms. As the length and the diameter of the object 102 change, the effective lengths of magnetic airgaps are also changing accordingly, affecting force gain coefficients. Therefore, the gains of feedback laws are advantageously also adjusted respectively to keep the robustness and stability of the magnetic suspension system. FIG. 1b illustrates the expansion and contraction of the object 102 in radial directions, a change of radius in the x-direction of the coordinate system 199 being depicted with $\Delta x$. FIG. 1c illustrates the expansion and contraction of the object 102 in the axial direction, a change of the axial length being depicted with $\Delta z$.

In a control system according to an exemplifying and non-limiting embodiment, the computing system 104 is configured to estimate forces acting on the magnetically levitated object 102 based on the computational model and data measured from the magnetic suspension system. The computing system 104 can be configured to recognize one or more predetermined behavioral patterns of the estimated forces, and to predict a need for maintenance depending on the recognized behavioral patterns of the estimated forces. Based on the computational model and the measured data, the forces acting on the object 102 can be estimated, along with their frequencies and magnitudes. This information can be utilized to evaluate the health status of the magnetic suspension system and of the process it is involved into. A given force pattern may characterize for example mechanical wear of an impeller and/or presence of contamination in the process. The control algorithm can be configured to distinguish predefined behavior, and based on the computational model, to predict a need for maintenance and its timeframe.

In a control system according to an exemplifying and non-limiting embodiment, the computational model of the magnetic suspension system comprises first model parameters modelling inductances of the coils as dependent on the position signals. In a control system according to an exemplifying and non-limiting embodiment, the computational model of the magnetic suspension system comprises second model parameters modelling resistances of the coils. In a control system according to an exemplifying and non-limiting embodiment, the computational model of the magnetic suspension system comprises third model parameters modelling eddy current and hysteresis losses in ferromagnetic parts of the magnetic suspension system.

Figure 2:
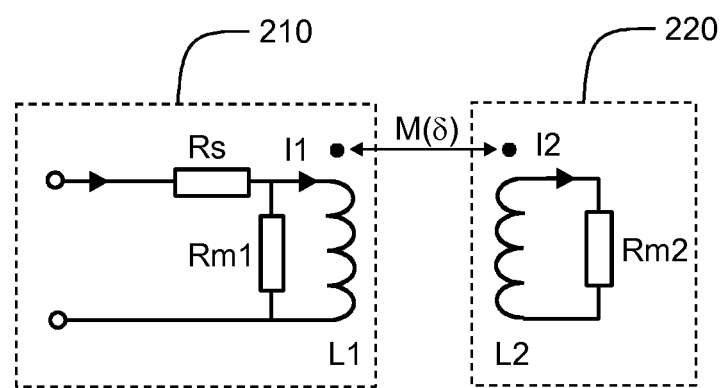
FIG. 2 illustrates an equivalent circuit for a part of a magnetic suspension system according to an exemplifying and non-limiting embodiment.

FIG. 2 illustrates an equivalent circuit for a part of a magnetic suspension system according to an exemplifying and non-limiting embodiment. A circuit 210 models a part of a magnetic actuator, and a circuit 220 models a part of the object 102 shown in FIGS. 1a-1c. A mutual inductance $M(\delta)$ is dependent on an airgap $\delta$ between the part of the magnetic actuator and the part of the object 102. L1 is the inductance of a respective coil of the magnetic actuator, and L2 models an ability of electric current induced in the object 102 to generate magnetic flux. Resistor Rs depicts resistance of the respective coil of the magnetic actuator, resistor Rm1 depicts eddy current and hysteresis losses in the ferromagnetic parts of the magnetic actuator, and resistor Rm2 depicts eddy current and hysteresis losses in the object 102. The magnetic flux linkage that crosses the airgap can be estimated as $\psi_M = M(\delta)(I1-I2)$, and the magnetic force acting between the part of the magnetic actuator and the part of the object 102 is proportional to $\psi_M^2$. If the object 102 is made of ideally lossless material, Rm2 is infinite and $\psi_M = M(\delta)I1$.

The controller 103 shown in FIG. 1a may comprise e.g. transistors, such as for example insulated gate bipolar transistors "IGBT" or metal oxide semiconductor field effect transistors "MOSFET", configured to constitute e.g. full-H bridges or half-H bridges and driver circuits for driving the transistors. Furthermore, the controller 103 may comprise analogue and/or digital circuitries configured to constitute regulators for controlling the driver circuits based on the position signals. The computing system 104 shown in FIG. 1a may comprise one or more processor circuits each of which can be a programmable processor circuit provided with appropriate software, such as for example a programmable Digital Signal Processor "DSP" or a programmable Micro Controller Unit "MCU", a dedicated hardware processor such as for example an application specific integrated circuit "ASIC", or a configurable hardware processor such as for example a field programmable gate array "FPGA". Furthermore, the computing system 104 may comprise one or more memory devices such as e.g. random-access memory "RAM" devices.

The specific examples provided in the description given above should not be construed as limiting the scope and/or the applicability of the appended claims. Lists and groups of examples provided in the description given above are not exhaustive unless otherwise explicitly stated.

What is claimed is:

1. A control system for controlling a magnetic suspension system, the control system comprising:
sensors configured to produce position signals indicative of a position of an object to be magnetically levitated, and
a controller configured to supply, in accordance with the position signals, electric currents to coils of magnetic actuators of the magnetic suspension system to magnetically levitate the object,
wherein the control system comprises a computing system configured to maintain and update a computational model of the magnetic suspension system based on identification runs where identification run signals are supplied to the coils of the magnetic suspension system and responses to the identification run signals are detected from at least one of following: the sensors and the coils, wherein the computing system is configured to compare quantities related to the computational model to quantities related to the magnetic suspension system to reveal differences of the magnetic suspension system with respect to the computational model.

2. The control system according to claim 1, wherein the computing system is configured to update the computational model periodically.

3. The control system according to claim 2, wherein the computing system is configured to update the computational model in response to predetermined events in the operation of the magnetic suspension system or based on parameters measured on the magnetic suspension system.

4. The control system according to claim 3, wherein the computational model of the magnetic suspension system comprises first model parameters modelling inductances of the coils as dependent on the position signals.

5. The control system according to claim 4, wherein the computational model of the magnetic suspension system comprises second model parameters modelling resistances of the coils.

6. The control system according to claim 5, wherein the computational model of the magnetic suspension system comprises third model parameters modelling eddy current and hysteresis losses in ferromagnetic parts of the magnetic suspension system.

7. The control system according to claim 2, wherein the computational model of the magnetic suspension system comprises first model parameters modelling inductances of the coils as dependent on the position signals.

8. The control system according to claim 7, wherein the computational model of the magnetic suspension system comprises second model parameters modelling resistances of the coils.

9. The control system according to claim 7, wherein the computational model of the magnetic suspension system comprises third model parameters modelling eddy current and hysteresis losses in ferromagnetic parts of the magnetic suspension system.

10. The control system according to claim 1, wherein the computational model of the magnetic suspension system comprises first model parameters modelling inductances of the coils as dependent on the position signals.

11. The control system according to claim 10, wherein the computational model of the magnetic suspension system comprises second model parameters modelling resistances of the coils.

12. The control system according to claim 11, wherein the computational model of the magnetic suspension system comprises third model parameters modelling eddy current and hysteresis losses in ferromagnetic parts of the magnetic suspension system.

13. The control system according to claim 10, wherein the computational model of the magnetic suspension system comprises third model parameters modelling eddy current and hysteresis losses in ferromagnetic parts of the magnetic suspension system.

14. The control system according to claim 1, the computing system is configured to estimate forces acting on the magnetically levitated object based on the computational model and data measured from the magnetic suspension system, to recognize one or more predetermined behavioral patterns of the estimated forces, and to predict a need for maintenance depending on the recognized behavioral patterns of the estimated forces.

15. A magnetic suspension system comprising:
an object to be magnetically levitated,
magnetic actuators configured to magnetically levitate the object, and
a control system for controlling electric currents supplied to coils of the magnetic actuators,
wherein the control system comprises:
sensors configured to produce position signals indicative of a position of the object, and
a controller configured to supply, in accordance with the position signals, the electric currents to the coils of the magnetic actuators to magnetically levitate the object,
wherein the control system comprises a computing system configured to maintain and update a computational model of the magnetic suspension system based on identification runs where identification run signals are supplied to the coils of the magnetic suspension system and responses to the identification run signals are detected from at least one of following: the sensors and the coils, wherein the computing system is configured to compare quantities related to the computational model to quantities related to the magnetic suspension system to reveal differences of the magnetic suspension system with respect to the computational model.

16. The magnetic suspension system according to claim 15, wherein the magnetic actuators comprise radial magnetic bearings.

17. The magnetic suspension system according to claim 16, wherein the magnetic actuators comprise axial magnetic bearings.

18. The magnetic suspension system according to claim 15, wherein the magnetic actuators comprise axial magnetic bearings.

* * * * *